(12) United States Patent
Kraemer et al.

(10) Patent No.: US 8,689,559 B2
(45) Date of Patent: Apr. 8, 2014

(54) SECONDARY COMBUSTION SYSTEM FOR REDUCING THE LEVEL OF EMISSIONS GENERATED BY A TURBOMACHINE

(75) Inventors: Gilbert O. Kraemer, Greer, SC (US); Jonathan D. Berry, Simpsonville, SC (US); Richard F. Keyser, Roscoe, IL (US)

(73) Assignee: General Electric Company, Schenectady, NY (US)

( * ) Notice: Subject to any disclaimer, the term of this patent is extended or adjusted under 35 U.S.C. 154(b) by 946 days.

(21) Appl. No.: 12/414,014

(22) Filed: Mar. 30, 2009

(65) Prior Publication Data

US 2010/0242482 A1 Sep. 30, 2010

(51) Int. Cl.
*F02C 1/00* (2006.01)

(52) U.S. Cl.
USPC ............................... 60/733; 60/746

(58) Field of Classification Search
USPC ................ 60/39.17, 733, 746, 776
See application file for complete search history.

(56) References Cited

U.S. PATENT DOCUMENTS

| | | | |
|---|---|---|---|
| 2,926,495 A * | 3/1960 | Benson et al. ............... | 60/746 |
| 3,872,664 A * | 3/1975 | Lohmann et al. ............ | 60/746 |
| 4,292,801 A | 10/1981 | Wilkes et al. | |
| 4,339,924 A * | 7/1982 | White et al. ................. | 60/733 |
| 4,735,052 A * | 4/1988 | Maeda et al. ............... | 60/733 |
| 4,875,339 A * | 10/1989 | Rasmussen et al. .......... | 60/757 |
| 4,928,481 A * | 5/1990 | Joshi et al. .................. | 60/737 |
| 4,936,090 A * | 6/1990 | Shekleton ................... | 60/786 |
| 5,156,002 A * | 10/1992 | Mowill ........................ | 60/738 |
| 5,177,956 A * | 1/1993 | Shekleton .................... | 60/804 |
| 5,214,911 A * | 6/1993 | Shekleton .................... | 60/778 |
| 5,259,184 A | 11/1993 | Borkowicz et al. | |
| 5,274,991 A | 1/1994 | Fitts | |
| 5,647,538 A * | 7/1997 | Richardson ................ | 239/405 |
| 5,660,045 A * | 8/1997 | Ito et al. ...................... | 60/737 |
| 5,749,219 A * | 5/1998 | DuBell ........................ | 60/737 |
| 6,047,550 A | 4/2000 | Beebe | |
| 6,192,688 B1 | 2/2001 | Beebe | |
| 6,438,961 B2 * | 8/2002 | Tuthill et al. ................ | 60/776 |
| 6,571,560 B2 * | 6/2003 | Tatsumi et al. .............. | 60/753 |
| 6,868,676 B1 | 3/2005 | Haynes | |
| 6,925,809 B2 * | 8/2005 | Mowill ........................ | 60/737 |
| 6,993,916 B2 * | 2/2006 | Johnson et al. .............. | 60/776 |
| 7,266,945 B2 * | 9/2007 | Sanders ....................... | 60/743 |
| 8,172,568 B2 * | 5/2012 | Kashihara et al. ........... | 431/285 |
| 8,381,532 B2 * | 2/2013 | Berry et al. .................. | 60/795 |
| 2006/0021350 A1 | 2/2006 | Sanders | |

(Continued)

FOREIGN PATENT DOCUMENTS

| | | | | |
|---|---|---|---|---|
| JP | 3012166 B2 * | 2/2000 | ............... | F02C 9/34 |
| WO | WO2009022449 A1 * | 2/2009 | ............. | F02C 7/232 |

OTHER PUBLICATIONS

Chinese Office Action for corresponding CN Application No. 201010156930.8, dated Jul. 12, 2013, pp. 1-16.

*Primary Examiner* — William H Rodriguez
*Assistant Examiner* — Lorne Meade
(74) *Attorney, Agent, or Firm* — Cantor Colburn LLP

(57) ABSTRACT

An embodiment of the present invention provides a method and system of operating a combustion system that has Lean direct injection (LDI) functionality. The method and system provides a passive cooling system for an injector of the LDI system. The method and system may also provide a means to direct the flow of the fluid exiting the injector of the LDI system.

7 Claims, 9 Drawing Sheets

(56) References Cited

U.S. PATENT DOCUMENTS

| | | | |
|---|---|---|---|
| 2006/0272332 A1* | 12/2006 | Moraes | 60/776 |
| 2007/0089419 A1* | 4/2007 | Matsumoto et al. | 60/737 |
| 2007/0227147 A1* | 10/2007 | Cayre et al. | 60/742 |
| 2009/0307922 A1* | 12/2009 | Kim | 431/254 |
| 2010/0136496 A1* | 6/2010 | Kashihara et al. | 431/285 |
| 2010/0170251 A1* | 7/2010 | Davis et al. | 60/740 |
| 2010/0229557 A1* | 9/2010 | Matsumoto et al. | 60/737 |

* cited by examiner

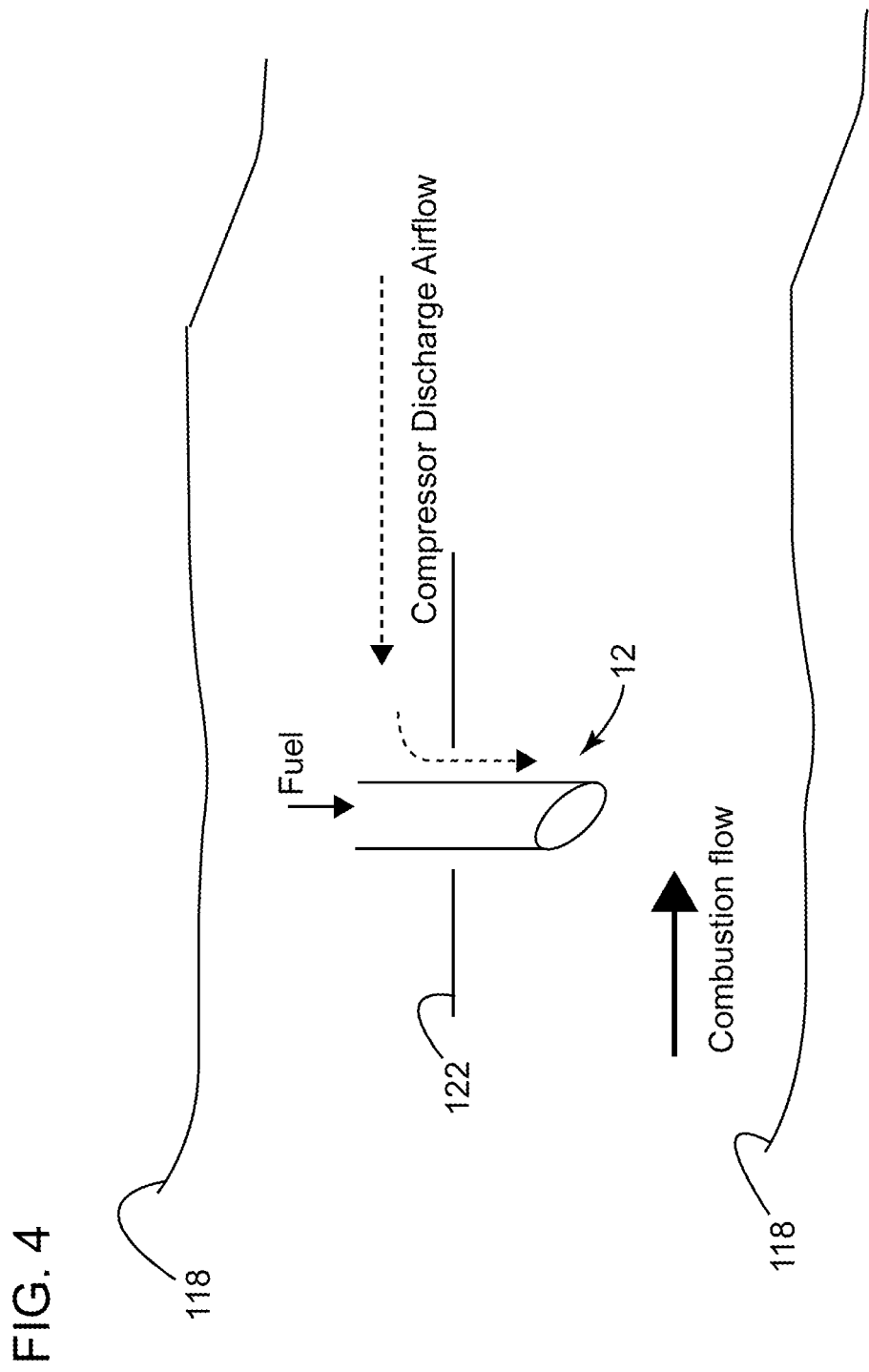

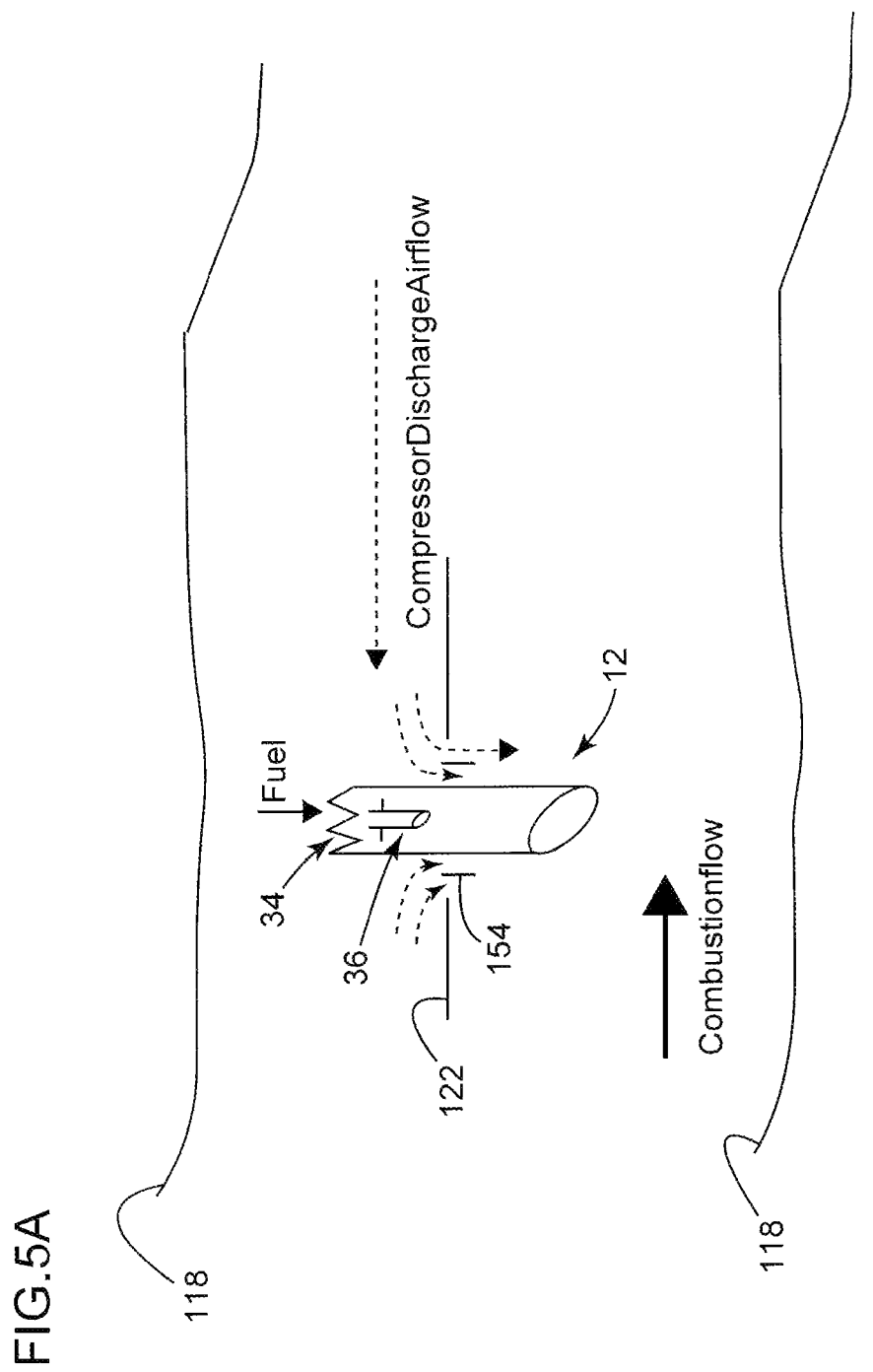

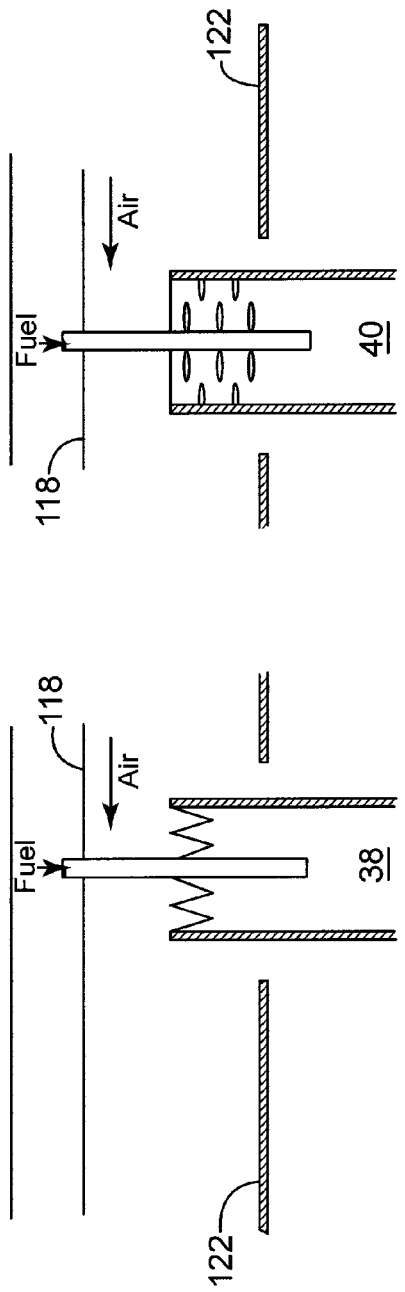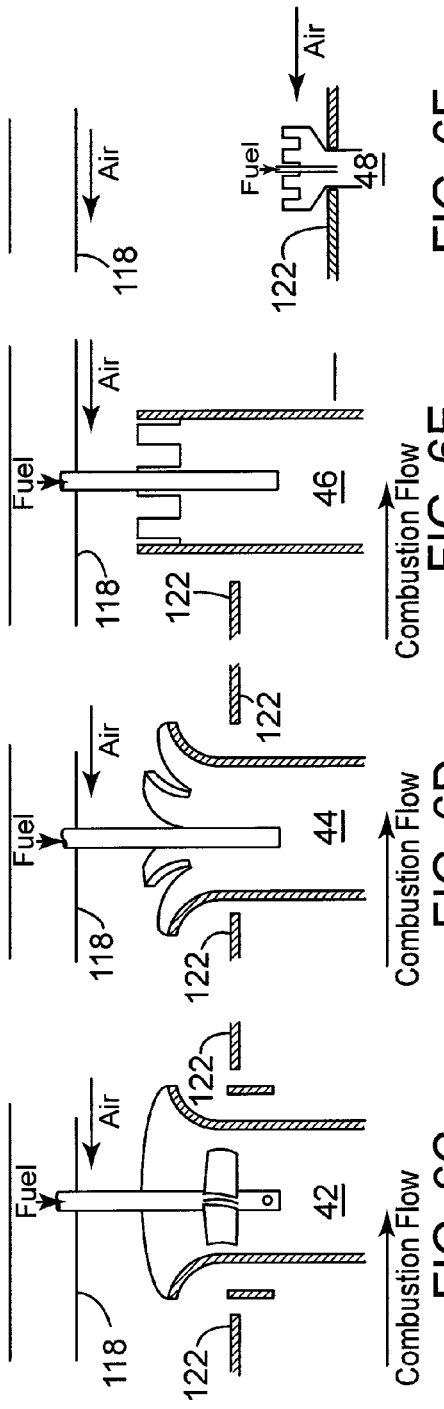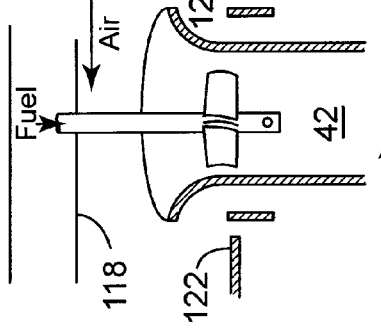

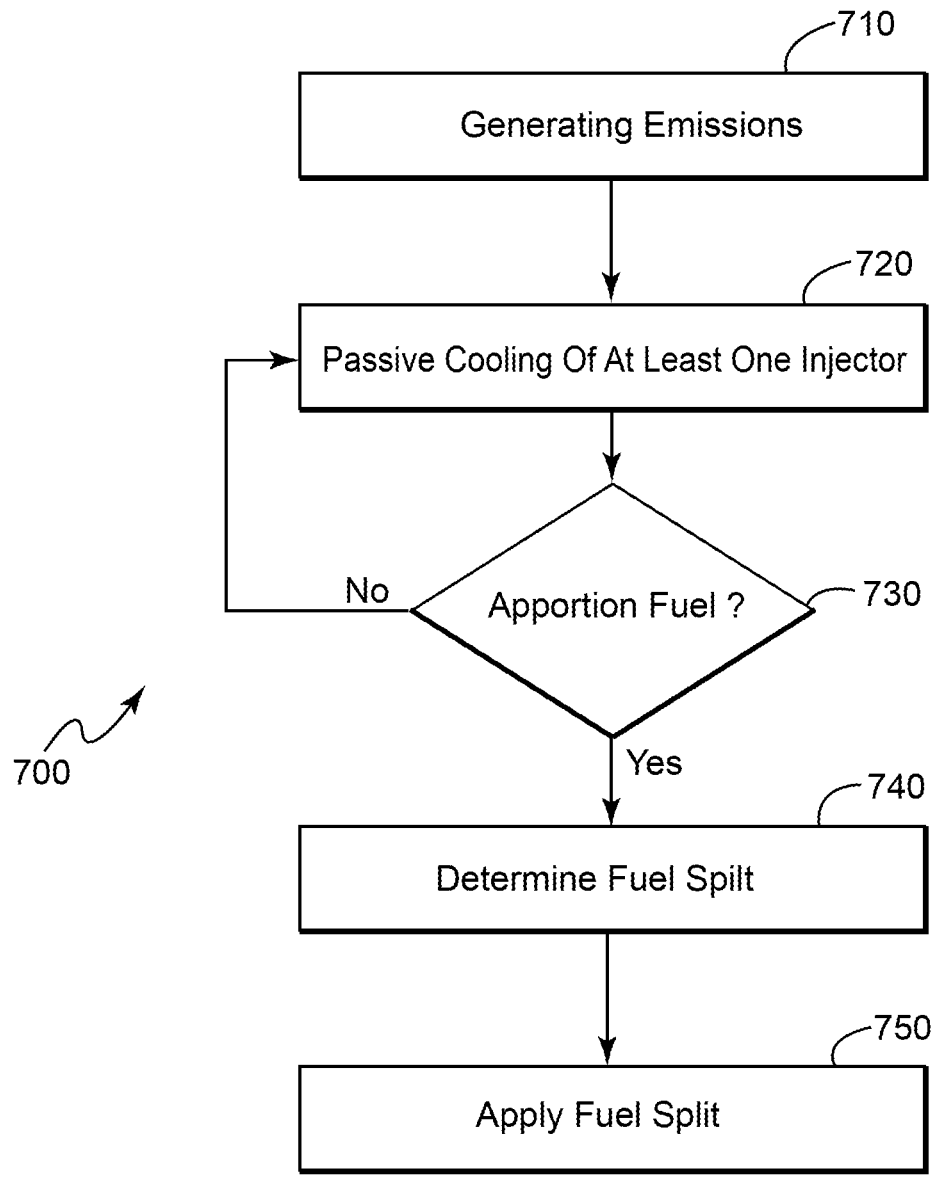

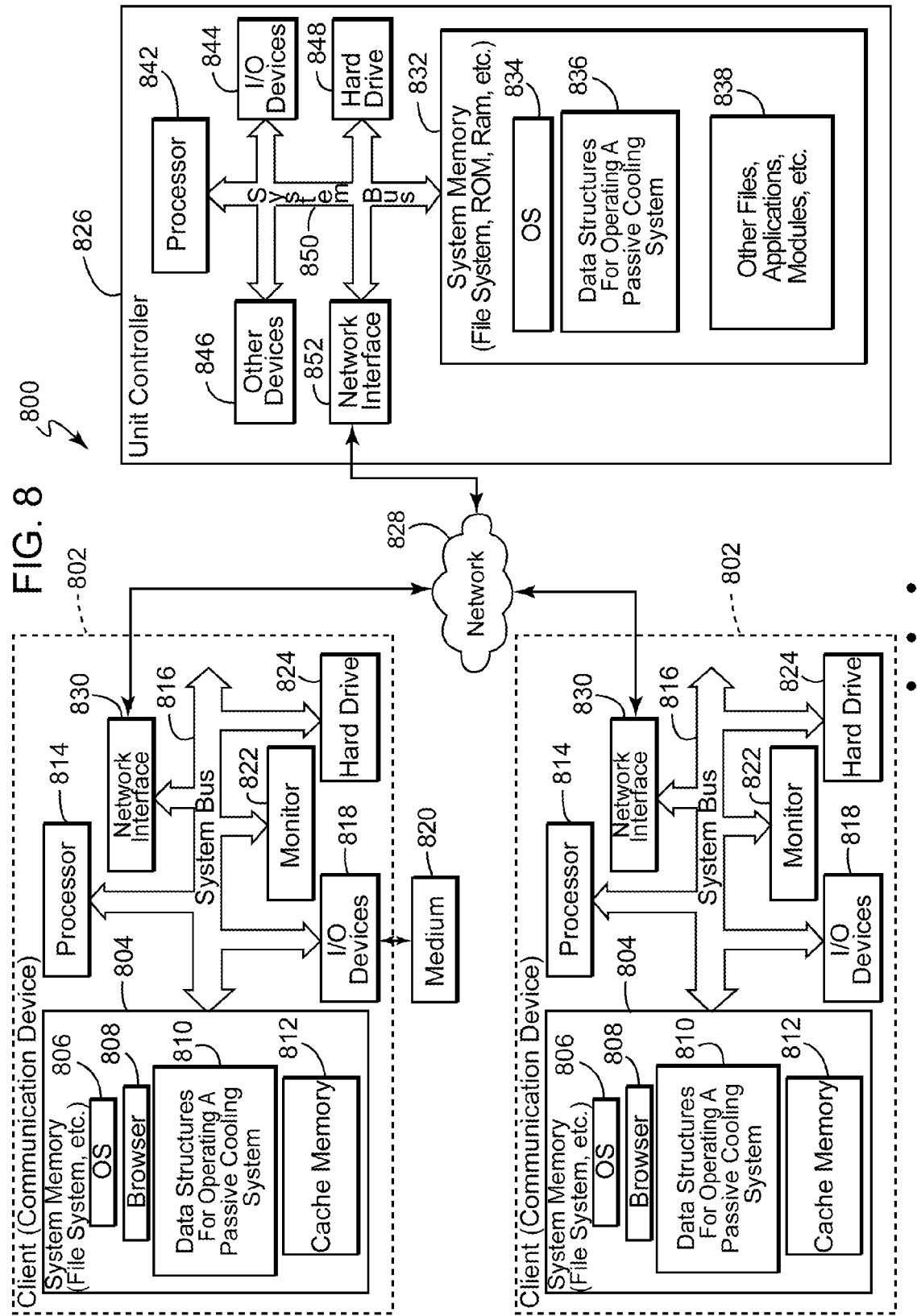

SECONDARY COMBUSTION SYSTEM FOR REDUCING THE LEVEL OF EMISSIONS GENERATED BY A TURBOMACHINE

BACKGROUND OF THE INVENTION

This invention relates generally to a combustion system and, more specifically, to a combustion system that comprises a primary reaction zone; and a secondary reaction zone, which includes an injector for injecting a fluid into a stream of combustion products generated within the primary reaction zone.

Generally, some combustions systems produce mechanical torque by combusting a fuel and air mixture. This process yields by-products including undesired emissions. Some combustion systems form an essential part of a turbomachine, such as, but not limiting of, a gas turbine. The primary emissions are oxides of nitrogen (NOx), carbon monoxide (CO), and unburned hydrocarbons (UHC). Oxidation of molecular nitrogen in air breathing machines, such as, but not liming of, gas turbines, is highly dependent upon the maximum temperature in the combustion system reaction zone and the residence time for the reactants at the maximum temperatures reached within the combustor. The level of thermal NOx formation is minimized by maintaining the reaction zone temperature below the level at which thermal NOx is formed or by maintaining an extremely short residence time at high temperature such that there is insufficient time for the NOx formation reactions to progress.

One method of controlling the temperature of the reaction zone below the level at which thermal NOx is formed is to premix fuel and air to a lean mixture prior to combustion. U.S. Pat. No. 4,292,801, dated October 1981, describes a dual stage-dual mode low NOx combustor based on lean premixed combustion technology for a gas turbine application. U.S. Pat. No. 5,259,184, dated November 1993, describes a dry low NOx single stage dual mode combustor construction for a gas turbine.

The thermal mass of the excess air present in the reaction zone of a lean premixed combustor absorbs heat and reduces the temperature rise of the products of combustion to a level where thermal NOx formation is reduced. However for some turbomachines, the required temperature of the generate combustion products entering the first stage turbine nozzle, at some load, requires operation at peak gas temperature in the reaction zone. Peak operation typically exceeds the thermal NOx formation threshold temperature resulting in significant NOx formation even though the fuel and air are in a lean premixed form. Therefore, there is a desire to obtain combustor exit temperatures high enough to meet the requirements of those turbomachines, without forming a significant amount of thermal NOx.

Lean premixed combustion of hydrocarbon fuels in air is widely used throughout the turbomachine industry for reducing emissions levels; in particular, thermal NOx emissions levels for gas turbine combustors. Lean direct injection (LDI) of hydrocarbon fuel and air is also an effective method for reducing NOx emission levels.

Some LDI systems require an active cooling system. The active cooling system may comprise an atomizing-air compressor, manifold, tubing, and other costly structure. An active cooling system may be considered a parasitic load on the output of the turbomachine; and consumes a significant amount of energy and requires operational costs.

Some LDI systems may not uniformly distribute the injected fuel and air mixture, which may lead to local high-NOx regions and cause hot streaks on some turbine and combustion hardware. Here, the position of the injectors may be fixed and not allow for adjustment.

There may be a desire for an improved method of operating an LDI system. The method should incorporate a passive cooling system and not require an active cooling system. The method should also allow for adjusting a position of the fluid exiting the injector.

BRIEF DESCRIPTION OF THE INVENTION

In accordance with an embodiment of the present invention, a method of reducing a level of emissions generated by a system, the method comprising: providing a combustion system for generating power, wherein the combustion system comprises: a primary combustion system comprising at least one primary fuel nozzle that generates a stream of combustion products; a secondary combustion system located downstream of the primary combustion system; wherein the secondary combustion system comprises at least one injector for delivering a fluid into the stream of combustion products; providing an airstream, wherein the airstream supplies air to the primary combustion system and the secondary combustion system; apportioning the fuel between the primary combustion system and the secondary combustion system.

In accordance with an alternate embodiment of the present invention, a system for reducing a level of emissions generated by the turbomachine, the system comprising: a turbomachine comprising: an inlet section, a compressor section, a turbine section, a combustion system, wherein the combustion system comprises: a primary combustion system comprising a plurality of primary fuel nozzles for generating a stream of combustion products; a secondary combustion system located downstream of the primary combustion system; wherein the secondary combustion system comprises multiple injectors for delivering a fluid into the stream of combustion products; wherein an airstream exits the compressor section and flows to the primary combustion system and to the secondary combustion system.

BRIEF DESCRIPTION OF THE DRAWING

FIG. 4 is a schematic illustrating flow paths of fluids used in the secondary combustion system, in accordance with an embodiment of the present invention.

FIGS. 5A and 5B, collectively FIG. 5, are schematics illustrating flow paths of fluids used in the secondary combustion system, in accordance with an alternate embodiment of the present invention.

FIG. 6A is a schematic diagram illustrating an injector end in accordance with an exemplary embodiment.

FIG. 6B is schematic diagram illustrating an injector end in accordance with another exemplary embodiment.

FIG. 6C is schematic diagram illustrating an injector end in accordance with still another exemplary embodiment.

FIG. 6D is schematic diagram illustrating an injector end in accordance with yet another exemplary embodiment.

FIG. 6E is schematic diagram illustrating an injector end in accordance with still yet another exemplary embodiment.

FIG. 6F is schematic diagram illustrating an injector end in accordance with a further exemplary embodiment.

FIG. 7 is a flow chart illustrating a method of operating a turbomachine in accordance with an embodiment of the present invention.

FIG. 8 is a block diagram of an exemplary system for operating a turbomachine in accordance with an embodiment of the present invention.

DETAILED DESCRIPTION OF THE INVENTION

Certain terminology is used herein for convenience only and is not to be taken as a limitation on the invention. For example, words such as "upper," "lower," "left," "front", "right," "horizontal," "vertical," "upstream," "downstream," "fore", and "aft" merely describe the configuration shown in the Figures. Indeed, the components may be oriented in any direction and the terminology, therefore, should be understood as encompassing such variations unless specified otherwise.

The following discussion focuses on an embodiment of the present invention integrated with a turbomachine, such as, but not limiting of, a gas turbine. Other embodiments of the present invention may be integrated with other combustion systems that operators may desire a reduction of the level of emissions. For example, but not limiting of, the other combustion systems may include a kiln, a furnace, a fired boiler, or the like.

An embodiment of the present invention provides a method of operating a combustion system that has LDI functionality. The method provides a passive cooling system for an injector of the LDI system. The method may also provide a means to direct the flow of the fluid exiting the injector of the LDI system.

Figure 1:
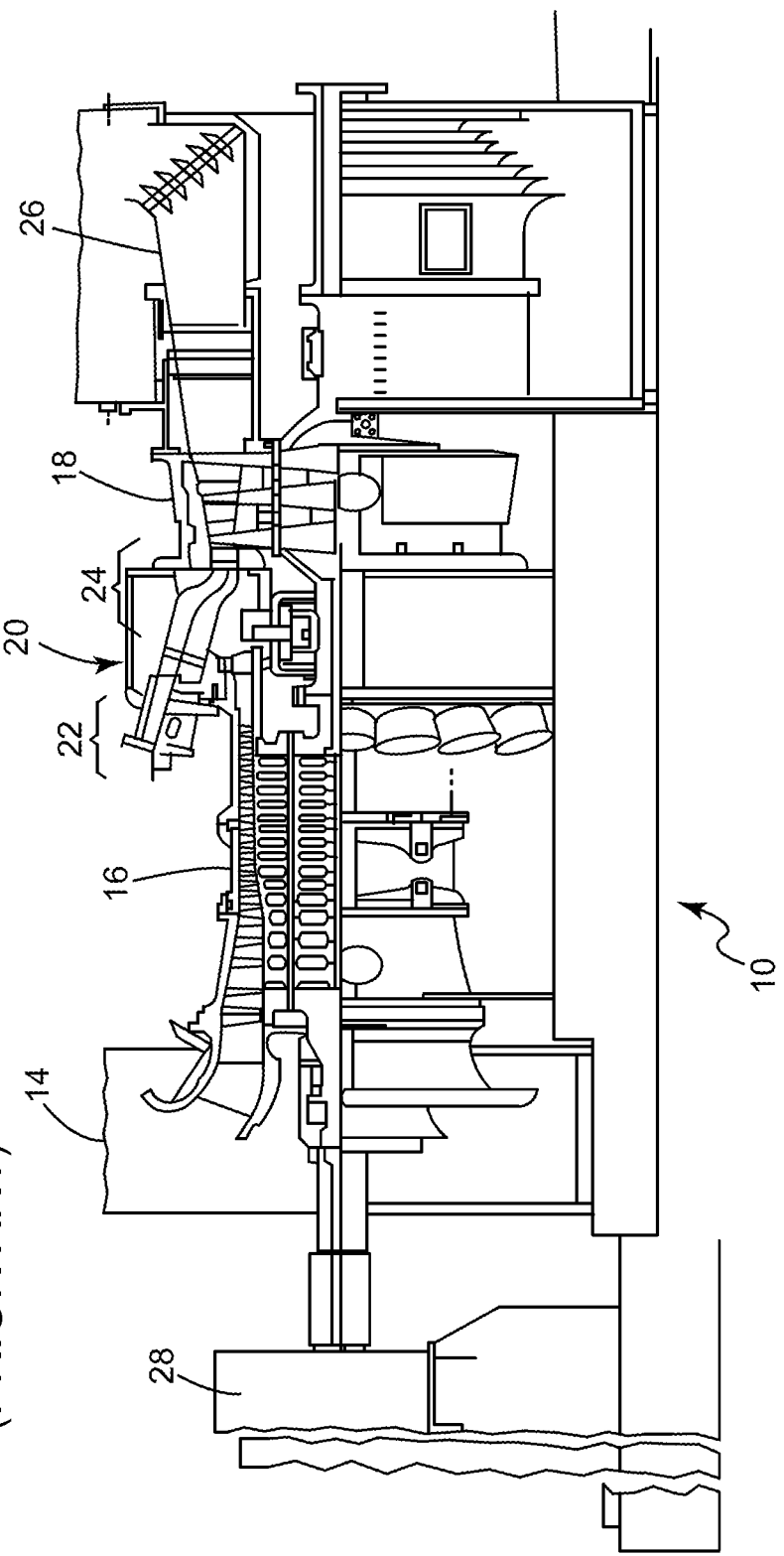
FIG. 1 is a partial cross-sectional side view of a turbomachine in accordance with an embodiment of the present invention.

Referring now to the Figures, where the various numbers represent like elements throughout the several views. FIG. 1 is a partial cross-sectional side view of a turbomachine 10 in accordance with an embodiment of the present invention. The turbomachine 10 may comprise a primary combustion system 22 and a secondary combustion system 24 including at least one injector 12, (not illustrated in FIG. 1), for injecting a secondary fluid, into a stream of combustion products generated by the primary combustion system 22.

An embodiment of the turbomachine 10 may comprise an inlet section 14; a compressor section 16 downstream from the inlet section 14; a combustion section 20 comprising a primary combustion system 22 downstream from the inlet section 14, and a secondary combustion system 24 downstream from the primary combustion system 22; a turbine section 18 and an exhaust section 26. The secondary combustion system 24 may be considered or integrated with the LDI system. As illustrated, for example, in FIG. 2 the secondary combustion system 24 may comprise at least one injector 12 for injecting a secondary fluid, such as, but not limiting of, a fuel and air mixture, into a stream of combustion products flowing from of the primary combustion system 22. Referring again to FIG. 1, the turbomachine 10 may also include a turbine section 18. The turbine section 18 may drive the compressor section 16 and the load 28 through a common shaft connection. The load 28 may be, but is not limited to, an electrical generator, a mechanical drive or the like.

The combustion section 20 may include a circular array of a plurality of circumferentially spaced combustors 110. A fuel and air mixture may be burned in each combustor 110 to produce a second stream of combustion products, which may flow through a transition piece 122 and then to a plurality of turbine nozzles 112 of the turbine section 18. A conventional combustor 110 is described in the above-noted U.S. Pat. No. 5,259,184. For purposes of the present description, only one combustor 110 may be referenced, all of the other combustors 110 arranged about the combustion section 20 may be substantially identical to the illustrated combustor 110.

Figure 2:
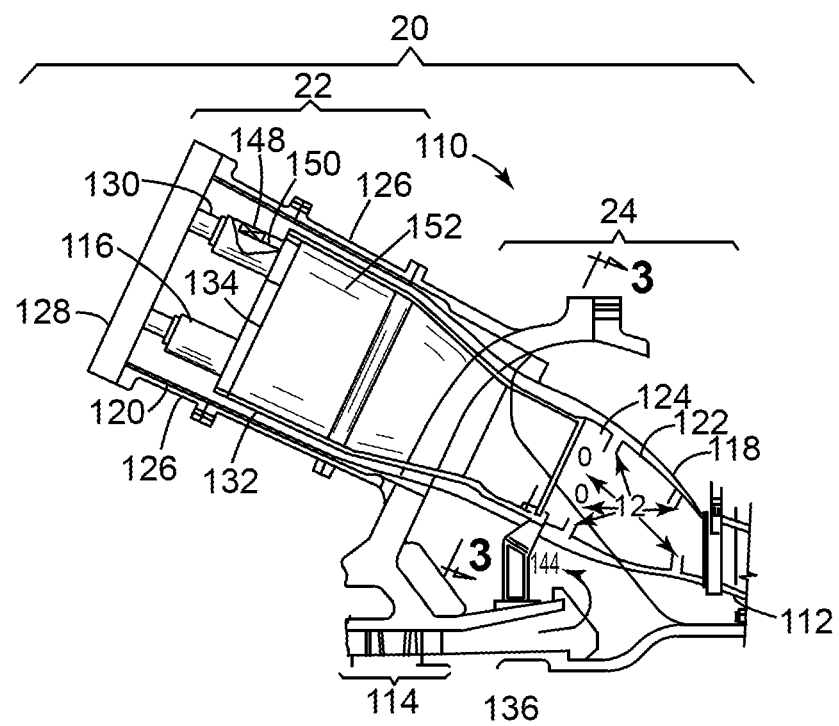
FIG. 2 is a cross-sectional side view of an embodiment of a combustor of FIG. 1.

Although FIG. 1 illustrates a plurality of circumferentially spaced combustors 110 and FIG. 2 shows a cross-section of a combustor 110 that may be considered a can combustor, the present invention may be used in conjunction with other combustor systems including and not limited to annular or can combustor systems.

FIG. 2 is a cross-sectional side view of an embodiment of a combustor 110 for a combustion section 20 of FIG. 1. FIG. 2 illustrates the combustor 110 comprising a primary combustion system 22 and a secondary combustion system 24 within an assembly; as described in U.S. Pat. No. 6,047,550 and U.S. Pat. No. 6,192,688. An embodiment of the combustor 110 also comprises an injector 12, and a transition piece 122, which generally allows for the generated combustion products to flow to the turbine nozzle 112.

An embodiment of the primary combustion system 22 may include a casing 126, an end cover 128, a plurality of start-up fuel nozzles 130, a plurality of premixing fuel nozzles 116, a cap assembly 134, a flow sleeve 120, and a combustion liner 132 within the flow sleeve 120. An example of a cap assembly 134 is described in U.S. Pat. No. 5,274,991. Combustion in the primary combustion system 22 may occur within the combustion liner 132. Typically, combustion air is directed within the combustion liner 132 via the flow sleeve 120 and enters the combustion liner 132 through a plurality of openings formed in the cap assembly 134. The air may enter the combustion liner 132 under a pressure differential across the cap assembly 134 and mixes with fuel from the start-up fuel nozzles 130 and/or the premixing fuel nozzles 116 within the combustion liner 132. Consequently, a combustion reaction occurs within the combustion liner 132 that releases heat energy that drives the turbine section 18.

High-pressure air for the primary combustion system 22 may enter the flow sleeve 120 and a impingement sleeve 118, from an annular plenum 144. The compressor section 16, represented by a series of vanes, blades at other compressor components 114 and a diffuser 136, supplies this high-pressure air. Each premixing fuel nozzle 116 may include a swirler 148, which may comprise a plurality of swirl vanes 150 that impart rotation to the entering air and allowing for the entering fuel to be distributed within the rotating air stream. The fuel and air then mix in an annular passage within the premix fuel nozzle 116 before reacting within the primary reaction zone 152.

Figure 3:
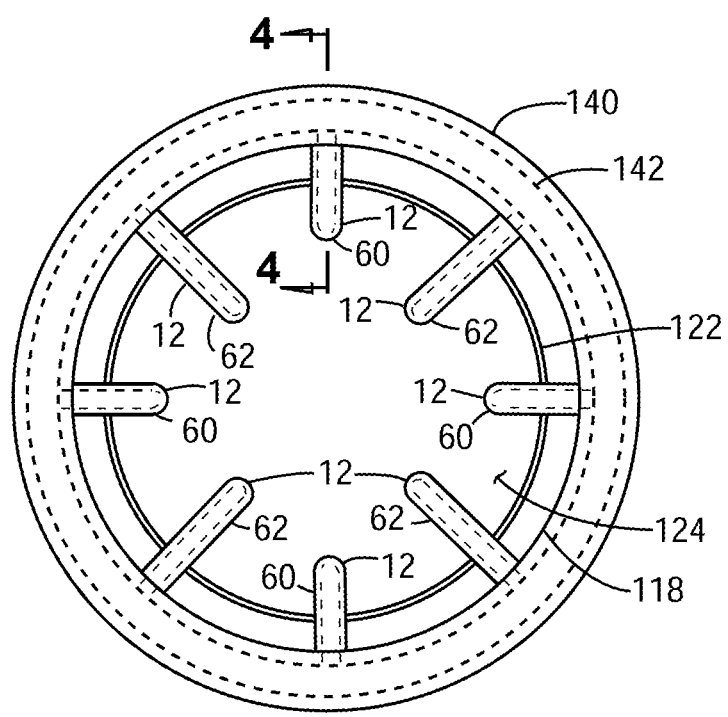
FIG. 3 is an axial view of an embodiment of a secondary combustion system of FIG. 2 in accordance with an embodiment of the present invention.

An embodiment of the secondary combustion system 24 may comprise an assembly 138 for communication with at least one injector 12. As illustrated in FIGS. 2 and 3, an embodiment of the assembly 138 may comprise a diluent manifold 140; a fuel mixture manifold 142; and a plurality of injectors 12 that may penetrate the combustion liner 132 and introduce additional fuel mixture and diluent into the secondary reaction zone 124 within the combustor 110. The combustion products exiting the primary reaction zone 152 may be at a thermodynamic state that allows for the auto-ignition of the secondary fuel mixture. The resulting secondary hydrocarbon fuel oxidation reactions go to substantial completion in the transition piece 122. An embodiment of the secondary combustion system 24 and injector 12 may allow for burning a fuel different from the fuel burned within the primary combustion system 22. For example, but not limiting of, the injector may allow for burning a synthetic fuel, syn-gas, or the like.

As illustrated in FIG. 2, an embodiment of the secondary combustion system 24 may comprise a plurality of injectors 12 positioned throughout. An embodiment of the present invention may function with at least one injector 12, located within the transition piece 122. An alternate embodiment of the present invention may incorporate a plurality of injectors 12 positioned throughout the transition piece 122, as illustrates, for example, but not limiting of, in FIG. 2. Here, the injectors 12 are positioned adjacent upstream and downstream ends of the transition piece 122. In an embodiment of the present invention the plurality of the injectors 12 may be insertable in a radial direction, axial direction, or combinations thereof. For example, but not limiting of, a first injector 12 may be positioned in an axial direction adjacent a downstream end of the transition piece 122 and a second injector 12 may be positioned in a radial direction adjacent an upstream end of the transition piece 122.

FIG. 3 is an axial view of an embodiment of a secondary combustion system 24 of FIG. 2 in accordance with an embodiment of the present invention. U.S. Pat. No. 6,868,676, dated Mar. 22, 2005 describes the embodiment of the secondary combustion system 24. As illustrated in FIG. 3, the secondary combustion system 24 may comprise a plurality of injectors 12 that may be spatially distributed in the stream of combustion products generated by the primary combustion system 22. The plurality of injectors 12 may include a combination of long injectors 62 and short injectors 60 such as, but not limiting of example, alternating long and short injectors 62,60.

FIGS. 4 and 5 are schematics illustrating flow paths of the fluids used in the secondary combustion system 24, in accordance with embodiments of the present invention. The fluids of the secondary combustion system 24 may comprise an air; a fuel, such as, but not limiting of, a natural gas; and mixtures thereof. The fluid flowing through the injector 12 of the secondary combustion system 24 may be dependent on the operating mode of turbomachine 10.

An embodiment of the present invention may comprise an injector 12 integrated with a passive cooling system. Here, the injector 12 may be continuously cooled when the turbomachine 10 is operating in a mode not requiring the secondary combustion system 24 to produce additional combustion products. The passively cooling system may eliminate the need for an expensive active cooling system, which may generally comprise: an atomizing air compressor, a steam source, or the like.

An embodiment of the passive cooling system may supply a portion of airflow discharging from the compressor section 16 to an upstream end of the injector 12. In some combustion systems, a circuit allows for the compressor section 16 to supply combustion air to the primary combustion system 22. Here, the passive cooling system may be linked with that circuit. This may reduce the need for enabling or disenabling the coolant flow to the injector 12.

Referring specifically to FIG. 4, which is a schematic illustrating flow paths of the fluids used in the secondary combustion system 24, in accordance with an embodiment of the present invention. As illustrated, the injector 12 may be connected between the impingement sleeve 118 and the transition piece 122. However, the present invention is not limited to locating the injector 12 between the impingement sleeve 118 and the transition piece 122; the injector 12 may be installed in other locations within the combustion section 20.

In an embodiment of the present invention, the compressor discharge airflow may travel upstream from the diffuser 136 towards the primary combustion system 22 (as illustrated in FIG. 2). A portion of the compressor discharge airflow may flow adjacent the injector 12 as illustrated in FIG. 4. When, the secondary combustion system 24 is generating combustion products, the compressor discharge airflow may be premixed with the fuel. The mixture may then auto-ignite due to the thermodynamic properties of the combustion products flowing from the primary combustion system 22. When the secondary combustion system 24 is not generating combustion products, the compressor discharge generally serves to cool the injector 12, which is heated by the flowing combustion products of the primary combustion system 22.

An embodiment of the injector 12 may comprise the form of a partially tubular shape having openings that allow for the fluid to enter the flow path of the primary and secondary combustion systems 22,24. An embodiment of the injector 12 may be considered a non-invasive injector, which may not extend into the combustion chamber and may be installed within the transition piece 122. An embodiment of the present invention may allow for adjusting a position of the fluid exiting the injector 12. This may allow for the positioning the path of the secondary combustion products flowing into the transition piece 122.

Figure 5B:
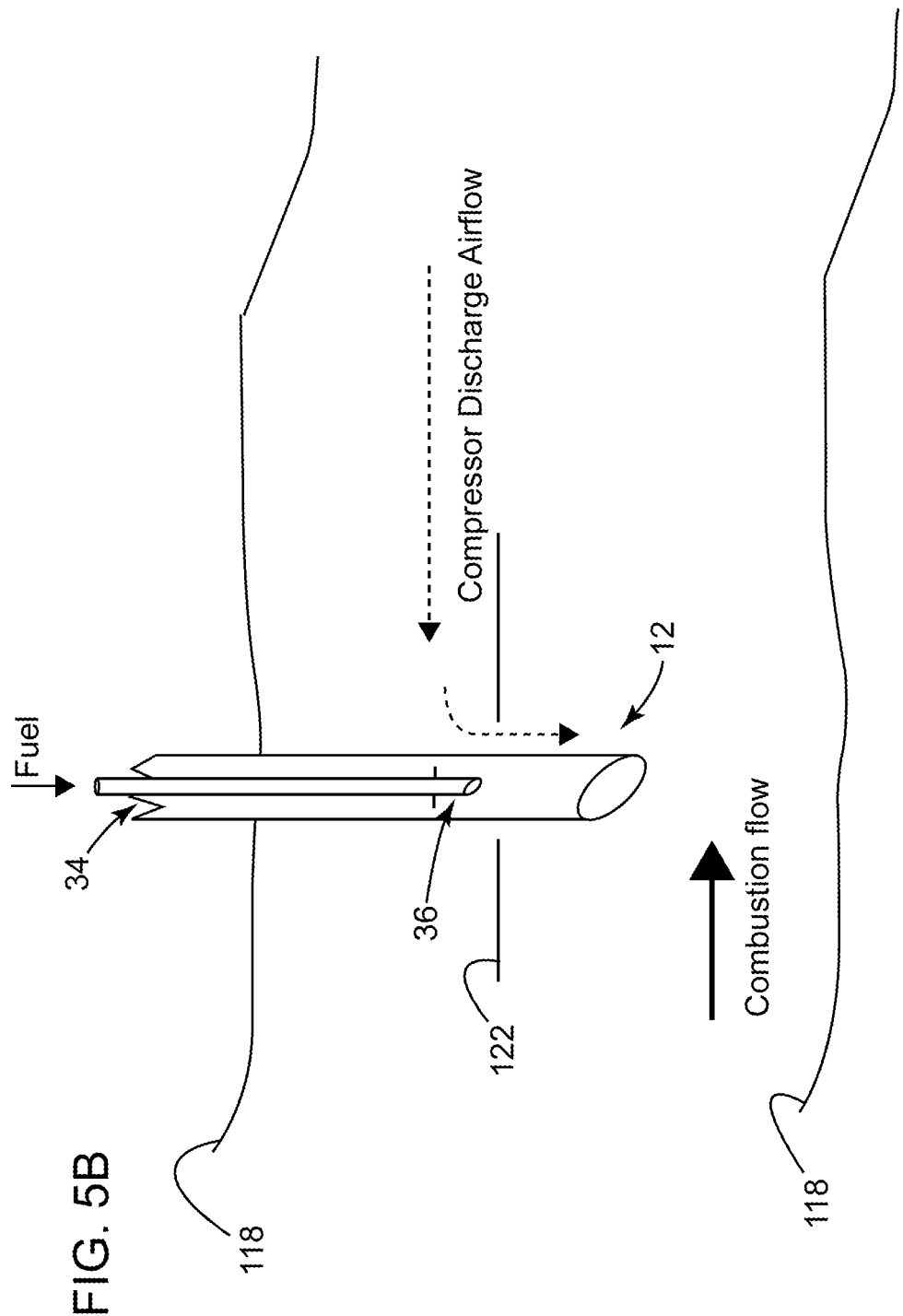

FIGS. 5A and 5B, collectively FIG. 5, are schematics illustrating flow paths of fluids used in the secondary combustion system 24, in accordance with alternate embodiments of the present invention. Essentially, FIG. 5 illustrates alternate embodiments of an injector 12 that may be incorporated with the secondary combustion system 24 of an embodiment of the present invention. Here, the injector 12 may comprise an injector end 34 and a turbulator 36.

The turbulator 36 may generally serve to aid with the premixing of the fuel and air. The turbulator 36 may take the form of a non-flame holding structure located near the injector end 34, as illustrated, for example, but not limiting of, in FIG. 5. Alternate embodiments of the injector 12 may include other premixer configurations.

The injector end 34 may generally function as an air inlet and serve to aid in the premixing of the fuel and air of the secondary combustion system 24. The injector end 34 may be located at an upstream end of the injector 12 and is the portion that receives and/or engages the fuel and air prior to combustion. The injector end 34 may also serve as a flow conditioner that allows for a nearly uniform flow of the fluid travelling in the injector 12. The injector end 34 may provide many benefits to the secondary combustion system 24, including: a) greater penetration of the fluid, b) enhanced premixing, and c) allow for radial staging of the fluid within the secondary combustion system 24.

FIG. 5A specifically illustrates an embodiment of the injector 12 that may be substantially secured by a portion of the transition piece 122. Here the impingement sleeve 118 may enclose the entire body of the injector 12. FIG. 5A also illustrates a coolant flow concentrator 154, which may aid in concentrating the flow of cooling air. Here, the cooling air flow may be considered a backing air purge allowing for a preferential direction of the cooling air flow.

FIG. 5B specifically illustrates an embodiment of the injector 12 that may be substantially secured by a portion of the transition piece 122 and a portion of the impingement sleeve 118. Here, a portion of the injector 12 may extend beyond a top surface of the impingement sleeve 118, as illustrated in FIG. 5B.

FIGS. 6A-6F schematically illustrate various embodiments of injector end 34 in accordance with alternate embodiments of the present invention. Each of the illustrated embodiments may be integrated with an embodiment of the secondary combustion system 24. These embodiments may provide a simple means to premix the fuel and air entering the injector 12, while providing cooling to the injector 12. These embodiments may also allow for longer length injectors 12 allow for a better distribution of the premixed fuel within the transition piece 122. As illustrated, these embodiments include: a saw-tooth end 38 (FIG. 6A), a perforated end 40 (FIG. 6B), a bell mouth end 42 (FIG. 6C), a pedal end 44 (FIG. 6 D), a castle end 46 (FIG. 6E), and a stepped end 48 (FIG. 6F). Other shapes, not illustrated in the Figures, of the injector end 34 may also be integrated within the present invention.

The components of an embodiment present invention may be formed of any material capable of withstanding the operating environment to which the injector end 34 and the injector 12 may be exposed.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram blocks. The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As discussed the present invention provides a method of operating a turbomachine 10 that comprises a primary combustion system 22 and a secondary combustion system 24. The method described herein represents merely one example of the present invention, and should not be consider the only method that may be used to implement the present invention.

FIG. 7 is a flow chart illustrating a method 700 of operating a turbomachine, or other air-breathing combustion system, in accordance with an embodiment of the present invention. As discussed, an embodiment of the present invention provides a method of operating a combustion system having LDI functionality, as described. The method may provide a passive cooling system for an injector of the LDI system. The method may also provide a means to direct the flow of the fluid exiting the injector and entering the flow path of the combustion system.

As discussed, the combustion system may be integrated with a turbomachine 10, such as, but not limiting of, a gas turbine, or other machine that incorporates a combustion system. In step 710 the turbomachine 10 may be generating emissions. Here, the turbomachine 10 may be operating in a start-up, spinning reserve, part-load status, or full load status.

In step 720, the method 700 may be passively cooling at least one injector 12 of the secondary combustion system 24. As discussed, an embodiment of the present invention provides a passive cooling system for the secondary combustion system 24. An embodiment of the present invention provides a method of passively cooling by utilizing compressor discharge air, a portion of which typically flows to the primary combustion system 22, to cool and/or provide air to the injector 12. Here, the injector 12 may receive the adequate airflow as the primary combustion system 22 also receives the adequate airflow. This passive feature may prove beneficial by allowing for the reduction of the parasitic loads associated with active cooling systems, such as, but not limiting of, operation of an atomizing air compressor.

In step 730, the method 700 may determine whether to apportion the fuel flowing in the combustion section 20. Here, as the operation status of the turbomachine 10 changes, an operator may desire to send more of the fuel to the primary combustion system 22 or to the secondary combustion system 24. If apportioning is required then the method 700 may proceed to step 740; otherwise the method 700 may revert to step 720.

In step 740, the method 700 may determine the split of the fuel flow between the primary combustion system 22 and the secondary combustion system 24. An embodiment of the present invention may automatically determine the split. An alternate embodiment of the present invention may allow a user to enter a desired flow split.

In step 750, the method 700 may apply the fuel split determined in step 740. An embodiment of the present invention may automatically apply the split. An alternate embodiment of the present invention may allow a user to apply the desired flow split.

The method 700 provides many novel benefits and features. In use, an embodiment of the injector 12 may allow for changing the fuel partitioning within the combustion system. This may allow for the injector 12 to send more air/fuel into one area of the secondary combustion system 24 than was previously flowing into that area.

When the turbomachine 10 operates at a lower load, the injectors 12 may not be used. Here, more compressor discharge air may flow to the primary combustion system 22, which may allow for a flame temperature that is lower and generates less NOx emissions.

When the turbomachine 10 operates at a higher load, the injectors 12 may be used. Here, more compressor discharge air may flow to the injector 12 to allow for premixing with the fuel. The actual air distribution may depend on the features of the selected embodiment of the fuel injector 12. This feature may reduce the resonance time and lower the NOx generation.

FIG. 8 is a step diagram of an exemplary system 800 to operate a passive cooling system in accordance with an embodiment of the present invention. The elements of the methods 700 may be embodied in and performed by the system 800. The system 800 may include one or more user or client communication devices 802 or similar systems or devices (two are illustrated in FIG. 8). Each communication device 802 may be for example, but not limited to a computer system, a personal digital assistant, a cellular phone, or similar device capable of sending and receiving an electronic message.

The communication device 802 may include a system memory 804 or local file system. The system memory 804 may include for example, but not limited to, a read only memory (ROM) and a random access memory (RAM). The ROM may include a basic input/output system (BIOS). The BIOS may contain basic routines that help to transfer information between elements or components of the communication device 802. The system memory 804 may contain an operating system 806 to control overall operation of the communication device 802. The system memory 804 may also include a browser 808 or web browser. The system memory 804 may also include data structures 810 or computer-executable code to operate a passive cooling system that may be similar or include elements of the method 700 in FIG. 7.

The system memory 804 may further include a template cache memory 812, which may be used in conjunction with the method 700 in FIG. 7, for operating a passive cooling system.

The communication device 802 may also include a processor or processing unit 814 to control operations of the other components of the communication device 802. The operating system 806, browser 808, data structures 810 may be operable on the processor 814. The processor 814 may be coupled to the memory system 804 and other components of the communication device 802 by a system bus 816.

The communication device 802 may also include multiple input devices, output devices or combination input/output devices 818. Each input/output device 818 may be coupled to the system bus 816 by an input/output interface (not shown in FIG. 8). The input and output devices or combination I/O devices 818 permit a user to operate and interface with the communication device 802 and to control operation of the browser 808 and data structures 810 to access, operate and control the software for operating a passive cooling system. The I/O devices 818 may include a keyboard and computer pointing device or the like to perform the operations discussed herein.

The I/O devices 818 may also include disk drives, optical, mechanical, magnetic, or infrared input/output devices, modems or the like. The I/O devices 818 may be used to access a medium 820. The medium 820 may contain, store, communicate, or transport computer-readable or computer-executable instructions or other information for use by or in connection with a system, such as the communication devices 802.

The communication device 802 may also include or be connected to other devices, such as a display or monitor 822. The monitor 822 may be used to permit the user to interface with the communication device 802.

The communication device 802 may also include a hard disk drive 824. The hard drive 824 may be coupled to the system bus 816 by a hard drive interface (not shown in FIG. 8). The hard drive 824 may also form part of the local file system or system memory 804. Programs, software, and data may be transferred and exchanged between the system memory 804 and the hard drive 824 for operation of the communication device 802.

The communication devices 802 may communicate with a remote server 826 and may access other servers or other communication devices similar to communication device 802 via a network 828. The system bus 816 may be coupled to the network 828 by a network interface 830. The network interface 830 may be a modem, Ethernet card, router, gateway, or the like for coupling to the network 828. The coupling may be a wired connection or wireless. The network 828 may be the Internet, private network, an intranet, or the like.

The server 826 may also include a system memory 832 that may include a file system, ROM, RAM, and the like. The system memory 832 may include an operating system 834 similar to operating system 806 in communication devices 802. The system memory 832 may also include data structures 836 for operating a passive cooling system. The data structures 836 may include operations similar to those described with respect to the method 700 in accordance with an embodiment of the present invention. The server system memory 832 may also include other files 838, applications, modules, and the like.

The server 826 may also include a processor 842 or a processing unit to control operation of other devices in the server 826. The server 826 may also include I/O device 844. The I/O devices 844 may be similar to I/O devices 818 of communication devices 802. The server 826 may further include other devices 846, such as a monitor or the like to provide an interface along with the I/O devices 844 to the server 826. The server 826 may also include a hard disk drive 848. A system bus 850 may connect the different components of the server 826. A network interface 852 may couple the server 826 to the network 828 via the system bus 850.

The flowcharts and step diagrams in the Figures illustrate the architecture, functionality, and operation of possible implementations of systems, methods and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the block diagrams and/or flowchart illustration, and combinations of steps in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system for reducing a level of emissions generated by a turbomachine, the system comprising:
the turbomachine comprising:
an inlet section,
a compressor section,
a turbine section,
a combustion system, wherein the combustion system comprises:
a primary combustion system comprising a plurality of primary fuel nozzles for generating a stream of combustion products;
a secondary combustion system located downstream of the primary combustion system; wherein the secondary combustion system comprises multiple injectors for delivering a fluid into the stream of combustion products, wherein each of the multiple injectors extends through and is spaced from a combustion system surface defining a combustion flow path establishing a first gap between the combustor surface and each of the multiple injectors; and
a coolant flow concentrator extending through the first gap, the coolant flow concentrator establishing a second gap between the coolant flow concentrator and each of the multiple injectors,
wherein an airstream exits the compressor section and flows to the primary fuel nozzles of the primary combustion system and to an injector end of each of the multiple injectors of the secondary combustion system, the injector end functioning as an air inlet of corresponding ones of each of the multiple injectors of the secondary combustion system, the injector end including one of a saw-tooth end, a bell-mouth end, a pedal end, and a castle end, a first portion of the air stream flowing into the injector end of each of the multiple injectors and a second portion of the airstream flowing through the first and second gaps the coolant flow concentrator concentrating the second portion of the airstream onto external surfaces of the multiple injectors and into the stream of combustion products to provide cooling to each of the multiple injectors.

2. The system of claim 1, wherein the fluid comprises at least one of an air, a fuel, or combinations thereof.

3. The system of claim 2, wherein the primary combustion system is enclosed by at least one of an end cover, a cap assembly, a flow sleeve, a combustion liner, a casing; or combinations thereof.

4. The system of claim 2, wherein the secondary combustion system is enclosed by at least one of: a transition piece, a combustion liner, a flow sleeve, an impingement sleeve, or combinations thereof.

5. The system of claim 1, wherein the multiple injectors further comprise at least one turbulator.

6. The system of claim 1, further comprising a control system comprising at least one processor, wherein the at least one processor performs the steps of:
determining whether the combustion system is generating emissions;
allowing for passive cooling of the multiple injectors;
determining whether to apportion a fuel between the primary combustion system and the secondary combustion system;
determining a fuel split between the primary combustion system and the secondary combustion system; and
applying the fuel split between the primary combustion system and the secondary combustion system.

7. The system of claim 1, further comprising: adjusting a position of a secondary combustion flame generated by the secondary combustion system.

* * * * *